United States Patent [19]

Uenohara et al.

[11] Patent Number: 4,579,207

[45] Date of Patent: Apr. 1, 1986

[54] CLUTCH COVER ASSEMBLY

[75] Inventors: Norihisa Uenohara, Moriguchi; Hideo Kagawa, Katano, both of Japan

[73] Assignee: Kabushiki Kaisha Daikin Seisakusho, Neyagawa, Japan

[21] Appl. No.: 624,724

[22] Filed: Jun. 26, 1984

[30] Foreign Application Priority Data

Jun. 27, 1983 [JP] Japan .............................. 58-99536[U]

[51] Int. Cl.$^4$ ............................................. F16D 13/18
[52] U.S. Cl. ............................... 192/70.18; 192/70.28
[58] Field of Search ........................... 192/70.18, 70.28

[56] References Cited

U.S. PATENT DOCUMENTS 3,213,991 10/1965 Smirl ................................ 192/70.18
3,640,361 2/1972 Spichala ............................ 192/70.18

Primary Examiner—Ronald H. Lazarus
Attorney, Agent, or Firm—Burns, Doane, Swecker & Mathis

[57] ABSTRACT

A clutch cover assembly, wherein a pressure plate for depressing a clutch disc is disposed in a clutch cover and an outer peripheral portion of the pressure plate is elastically connected to the clutch cover through a strap plate; characterized by that the clutch cover and the strap plate are fixed together by folding down a part of the clutch cover.

7 Claims, 10 Drawing Figures

CLUTCH COVER ASSEMBLY

FIELD OF THE INVENTION

This invention relates mainly to a clutch cover assembly suitable for an automobile.

DESCRIPTION OF THE PRIOR ART

In FIG. 1 showing a conventional clutch cover assembly, a clutch cover 2 is securely fixed to a flywheel 1, and a leaf-spring-like strap plate 5 is arranged between the cover plate 2 and a projected part 4 formed integrally with an outer peripheral portion of a pressure plate 3 in order to hold the pressure plate 3, which is used for depressing a clutch disc (not shown) disposed in the clutch cover 2, in a predetermined position of the cover 2. One end of the plate 5 is fastened to the cover 2 by means of a rivet 6 and the other end thereof is fastened to the projected portion 4 by means of a rivet 7, whereby the plate 5 always urges the pressure plate 3 in the direction of the arrow $X_1$.

In the above-mentioned conventional mechanism, however, there are disadvantages not only of including a large number of components but of difficulty in assembly work because the plate 5 is fastened to the cover 2 by means of the rivet 6.

SUMMARY OF THE INVENTION

In consideration of the above disadvantages, in this invention, objects of this invention are to make the rivet unnecessary, to lessen the number of components, to make the assembly work easy, and to simultaneously decrease cost and weight by fixing the strap plate with a part of the clutch cover folded down.

In order to accomplish the above objects in this invention, in a clutch cover assembly wherein a pressure plate for depressing a clutch disc is disposed in a clutch cover and an outer peripheral portion of the pressure plate is elastically connected to the clutch cover through a strap plate; the clutch cover and the strap plate are fixed together by folding down a part of the clutch cover.

DETAILED DESCRIPTION OF THE INVENTION

Figure 1:
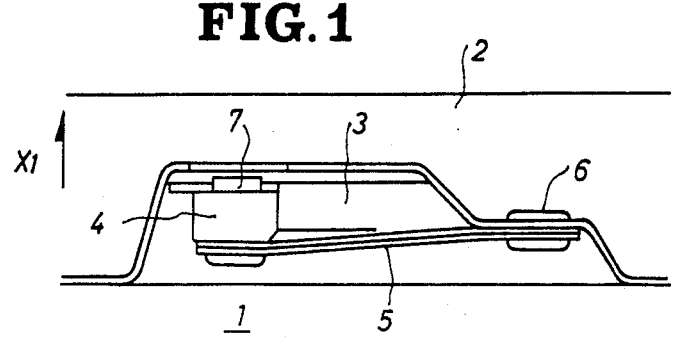
FIG. 1 is a partial side view of a conventional clutch cover assembly.
Figure 2:
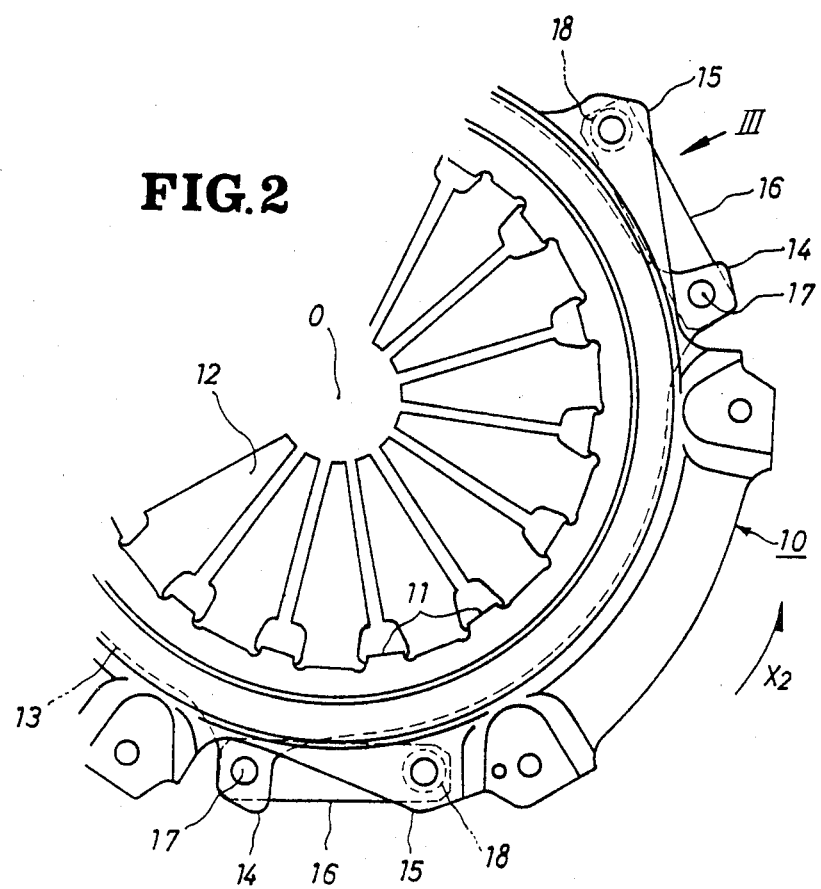
FIG. 2 is a partial elevation view of a clutch cover assembly according to this invention.

FIG. 2 is a partial elevation view of a clutch cover assembly according to the present invention. A clutch cover 10 is an annular member having its center on a center 0, and a supporting portion 11 of an inner peripheral edge supports a concentric diaphragm spring 12. An annular pressure plate 13 for depressing a clutch disc (not shown) is concentrically arranged in the cover 10 (at the back side), and an outer peripheral edge of the diaphragm spring 12 contacts with the pressure plate 13 in the cover 10 to urge the plate 13 toward the back side of paper surface. Plural projected portions 14 projecting outwardly and spaced equally in the circumferential direction are formed on an outer peripheral edge of the plate 13. An approximately rectangular strap plate 16 extending in nearly circumferential direction is disposed between said projected portion 14 and a flange portion 15 of the clutch cover 10 positioned in rotational front side (in the direction of arrow $X_2$) of the projected portion 14, and the pressure plate 13 is elastically supported by the clutch cover 10 through the plate 16 composed of spring steel such as SK material freely movably in the direction normal to the paper surface.

Figure 3:
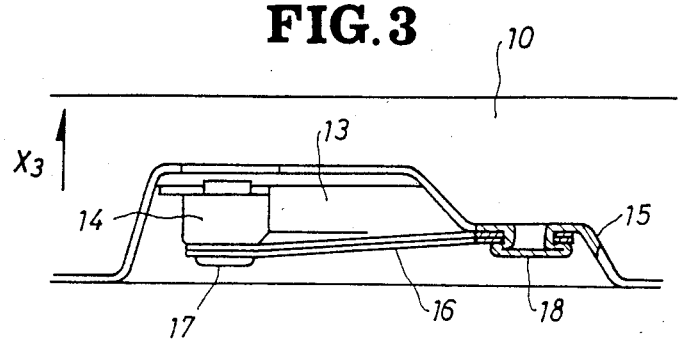
FIG. 3 is a partially fragmental drawing viewed in the direction of arrow III of FIG. 2.

As seen from FIG. 3 showing the drawing viewed in the direction of arrow III of FIG. 2, the strap plate 16 is a double-split leaf-spring-like member, one end of which is fastened to the projected portion 14 of the pressure plate 13 by means of the rivet 17. The other end of the plate 16 is fitted onto a column-like hollow projection 18 formed on the flange portion 15 of the clutch cover 10, then integrally fastened to the flange portion 15 by folding down through caulking a tip end portion of the projection 18. The strap plate 16 is always apt to return to a state of flat plate so that the pressure plate 13 is always urged in the direction of $X_3$.

Function of the assembly will be described hereunder. In FIG. 2, when an inner peripheral edge of the diaphragm spring 12 is moved through means of a release bearing (not shown) in the direction of a center axis, the outer peripheral edge of the spring 12 moves the pressure plate 13 with the supporting portion 11 as a fulcrum in the direction of the center axis to allow engagement and disengagement of the clutch.

Figure 4:
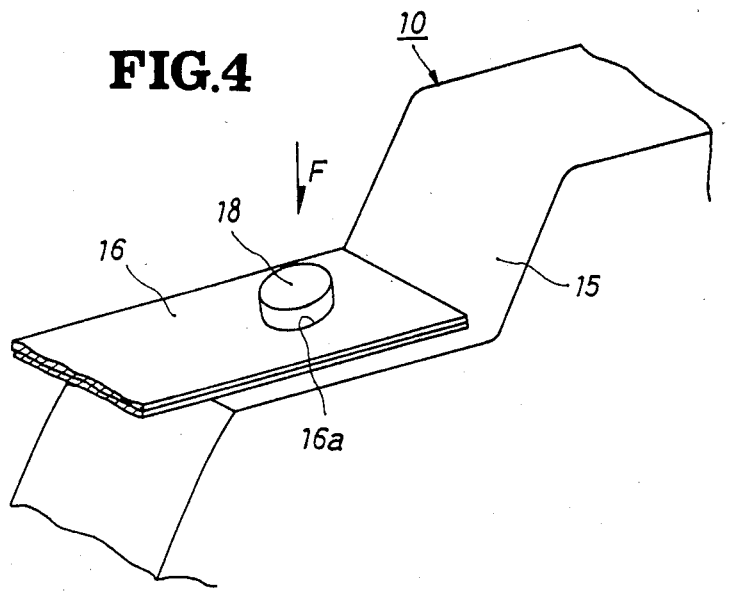
FIG. 4 is a partial oblique view showing a state in the course of assembly.

To manufacture the above-mentioned clutch cover assembly, as shown in FIG. 4, a hole 16a formed on an end portion of the strap plate 16 is fitted onto the column-like hollow projection 18 formed on the flange portion 15 of the cover 10, then projection 18 is compressedly caulked in the direction of F to be securely fastened as shown in FIG. 3.

As described above, in this invention, in the clutch cover assembly wherein the pressure plate 13 for depressing clutch disc is disposed in the clutch cover 10 and the outer peripheral portion of the pressure plate 13 is elastically connected to the clutch cover 10 through the strap plate 16; the clutch cover 10 is fixed to the strap plate 16 by folding down a part of the clutch cover 10 (for instance, the projection 18). Therefore, the rivet becomes unnecessary, which has hitherto been required for connecting the clutch cover 10 to the strap plate 16. Consequently, the advantages are obtainable that the number of components required can be lessened, the assembly work becomes simple, and the cost and weight thereof can be decreased simultaneously.

Incidentally, the following methods may be employed in embodying the present invention.

Figure 5:
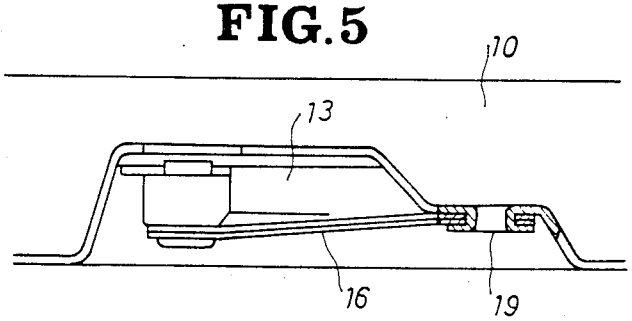
FIGS. 5, 7 and 9 are views showing other embodiments corresponding to FIG. 3.
Figure 6:
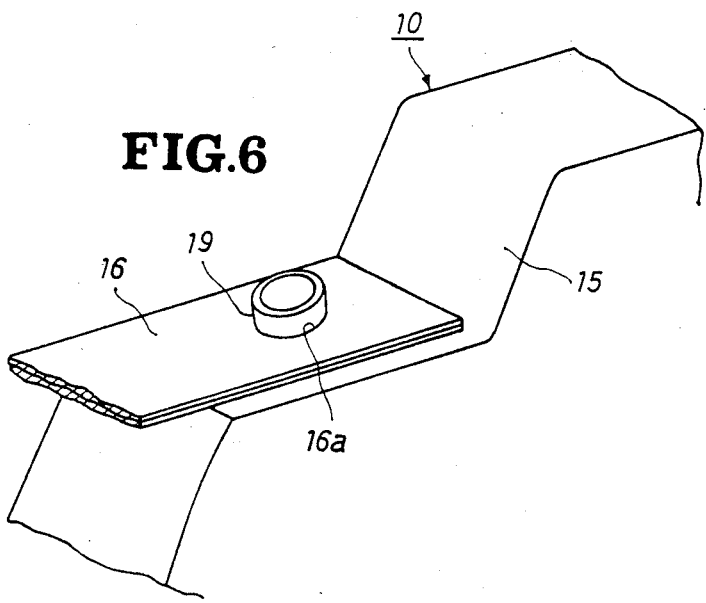
FIGS. 6, 8 and 10 are partial oblique views showing states in the course of assembly corresponding to the embodiments of FIGS. 5, 7 and 9 respectively.

(a) The clutch cover 10 may be fixed to the strap plate 16 by caulking the projection into a curled form as shown in FIG. 5. In this instance, the projection 19 is formed into a cylindrical shape as shown in FIG. 6. Further, when the column-like hollow projection 18 as illustrated in FIG. 4 is caulked, it may be caulked into the curled form by previously making a hole on its center.

Figure 7:
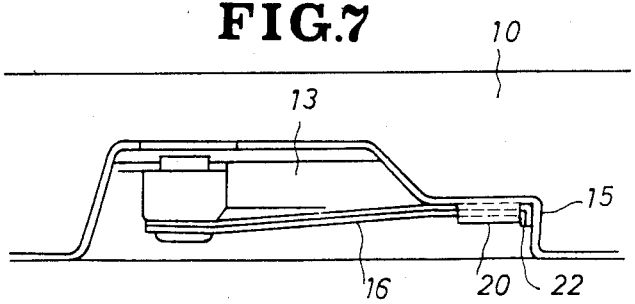
Figure 8:
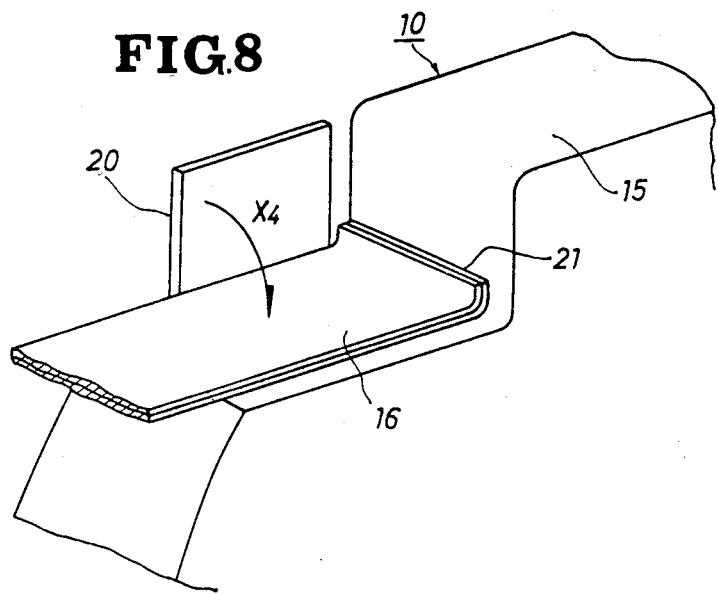

(b) The strap plate 16 may be fixed by folding down a tongue-like rectangular projection 20 formed on an outer peripheral edge of the flange portion 15 as shown in FIG. 7. In this instance, the projection 20 is folded down in the direction of arrow $X_4$ as shown in FIG. 8. An edge end portion of the strap plate 16 is previously folded up to form a stopper 21. Further, the flange portion 15 is folded in the perpendicular direction to hold the stopper 21 of the plate 16 as shown in FIG. 7.

Figure 9:
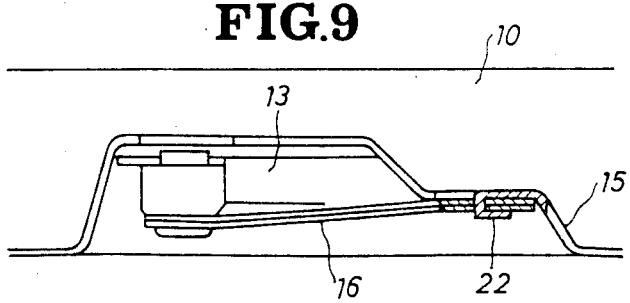
Figure 10:
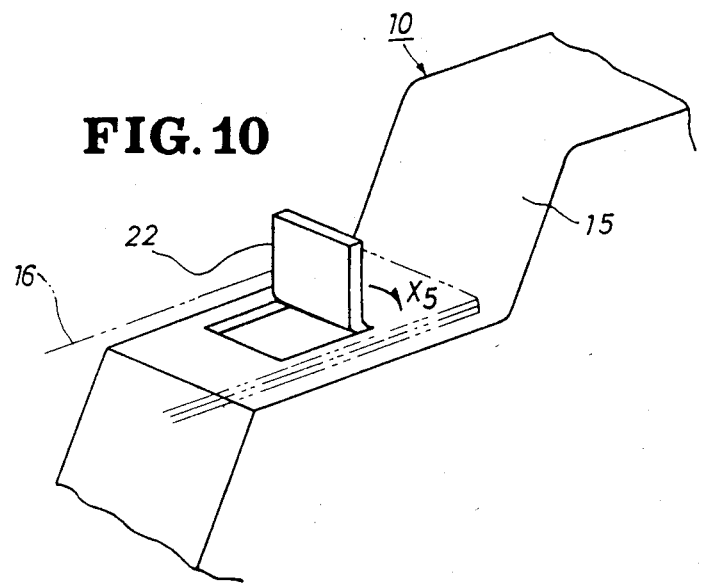

(c) As illustrated in FIG. 9, the plate 16 may be fixed by cutting and standing upright the flange portion 15 to form a projection 22, fitting a slit-like hole of the strap plate 16 onto the projection 22, then folding the projection 22 in the direction of $X_5$ (FIG. 10). A form of the projection 22 may be semi-circule or others in addition to the rectangular form illustrated in FIG. 10.

What is claimed is:

1. In a clutch cover assembly having a clutch cover, a pressure plate disposed in the clutch cover for depressing a clutch disc, and a strap plate elastically connecting an outer peripheral portion of the pressure plate and the clutch cover the improvement comprising a projecting part of the clutch cover, and an associated portion of the strap plate, the projecting part of the clutch cover and the associated portion of the strap plate being fixed together by folding down at least a portion of the projecting part of the clutch cover.

2. A clutch cover assembly as set forth in claim 1, in which the projecting part of said clutch cover has the shape of a hollow column-like projection, the associated portion of the strap plate has a hole which receives the column-like projection, and column-like projection is folded down to hold the strap plate and the clutch cover together.

3. A clutch cover assembly as set forth in claim 1, in which the projecting part of said clutch cover has has the shape of a cylindrical projection, the associated portion of the strap plate has a hold which receives the cylindrical projection, and the cylindrical projection is folded down into a curled form to hold the strap plate and the clutch cover together.

4. A clutch cover assembly as set forth in claim 1, in which the projecting part of said clutch cover has the shape of a tongue-like rectangular projection formed on an outer peripheral edge of a flange portion of the clutch cover, and the tongue-like rectangular projection is folded down onto the associated portion of the strap plate to hold the strap plate and the clutch cover together.

5. A clutch cover assembly as set forth in claim 1, in which the projecting part of said clutch ocver is a projection formed by cutting and standing upright a flange portion of the clutch cover, said strap plate includes a hole, and said projection is folded down after being fitted into said hole to hold the strap plate and the clutch cover together.

6. A clutch cover assembly comprising:
    a pressure plate operable to depress an associated clutch disc, having an outer peripheral portion;
    a generally circular clutch cover having an integral projecting part;
    an elastic strap plate connected to the outer peripheral portion of the pressure plate and connected to the clutch cover, having a portion associated with the projecting part of the clutch cover, at least a portion of the projecting part of the clutch cover being folded securely against the associated portion of the elastic strap plate and holding the strap plate together with the clutch cover.

7. The clutch cover assembly of claim 6 wherein:
    the projecting part of the clutch cover has the shape of an open ended cylindrical projection;
    the associated portion of the strap plate has an opening which generally conforms to the external shape of the cylindrical projection and which receives the cylindrical projection therethrough; and
    the open ended portion of the cylindrical projection is tightly curled against the strap plate to securely hold the strap plate and clutch cover together.

* * * * *